United States Patent [19]
Wright et al.

[11] Patent Number: 5,426,594
[45] Date of Patent: Jun. 20, 1995

[54] ELECTRONIC GREETING CARD STORE AND COMMUNICATION SYSTEM

[75] Inventors: James A. Wright, Coral Springs; Ali Saidi, Boynton Beach, both of Fla.

[73] Assignee: Motorola, Inc., Schaumburg, Ill.

[21] Appl. No.: 42,193

[22] Filed: Apr. 2, 1993

[51] Int. Cl.⁶ .............................................. G08B 5/22
[52] U.S. Cl. ............................... 364/514 R; 358/402; 379/96; 455/151.2
[58] Field of Search ............................ 364/419.2, 514; 340/723; 382/2; 358/402; 379/93, 96, 100; 455/151.2, 33.1

[56] References Cited

U.S. PATENT DOCUMENTS

| | | | |
|---|---|---|---|
| 4,352,100 | 9/1982 | O'Connell | 340/723 |
| 4,654,799 | 3/1987 | Ogaki et al. | |
| 4,754,487 | 6/1988 | Newmuis | 382/2 |
| 4,951,203 | 8/1990 | Halamka | 364/419.2 |
| 5,018,085 | 5/1991 | Smith, Jr. | |
| 5,036,314 | 7/1991 | Barillari et al. | |
| 5,036,472 | 7/1991 | Buckley et al. | |
| 5,038,293 | 8/1991 | Goodman | |
| 5,056,029 | 10/1991 | Cannon | |
| 5,065,447 | 11/1991 | Barnsley et al. | |
| 5,132,915 | 7/1992 | Goodman | |
| 5,138,311 | 8/1992 | Weinberg | |

OTHER PUBLICATIONS

Iterated Systems, Inc., "Images Incorporated for Windows", sales brochure.
Mobile Computing, "Personal Communicator Poses Design Challenges" by Robert J. Scavuzzo, 1992 (no month) Systems Design Guide, Electronic Engineering Times, pp. 16–18.
Electronic Design for Engineers and Engineering Managers Worldwide, "No-Frills Compression Delivers Low-Cost PC Video" by Jack Shandle, cover sheet and pp. 37–40–4 Mar. 1993.

Primary Examiner—Ellis B. Ramirez
Assistant Examiner—Thomas Peeso
Attorney, Agent, or Firm—Keith A. Chanroo

[57] ABSTRACT

An electronic greeting card communication system (100) includes a first personal communicator (102), an electronic mail server (136), and a second personal communicator (102). The first personal communicator accepts off-line selection of an electronic greeting card from a user (502), and then transmits a request message corresponding to the off-line selection. The electronic mail server (136) receives the request message and then wireless transmits an electronic greeting card message to the second personal communicator (102) and updates billing information (620) for billing the user of the first personal communicator (102). The second personal communicator (102) selectively receives the wireless transmitted electronic greeting card message and presents it to a user.

13 Claims, 8 Drawing Sheets

ELECTRONIC GREETING CARD STORE AND COMMUNICATION SYSTEM

FIELD OF THE INVENTION

This invention relates generally to electronic mail communication systems, and more particularly to a method in a personal communicator for a user of the personal communicator to select and pay for an electronic greeting card and to send it to another personal communicator for presentation to a user thereof.

BACKGROUND OF THE INVENTION

In today's ever increasing mobile society portable personal communicators are becoming a standard carry item for members of society. Besides including a computing device a personal communicator may include a communication receiver, such as a radio frequency receiver, for receiving transmitted wireless messages. A personal communicator therefore may operate as a selective call receiver to receive messages and to present the messages to a user of the personal communicator such as by displaying the messages on a display.

Additionally, it is customary for many different occasions for individuals to give each other greeting cards with messages for particular occasions. Typically, an individual would go to a store and select a greeting card that is made from a paper product with an image and a message printed thereon. The individual would pay the cashier a predetermined amount of money and then take possession of the greeting card. Subsequently, the individual may hand write a personal message on the card and then give the card to a receiving party. The process described above can be inconvenient for a purchaser and sender of the card because it requires the individual to physically go to the store, manually search through many cards located on shelves, pay a cashier with money carried on ones person, physically write a personal message on the card, and then possibly send the card to a receiving party such as by air mail with all the costs and delays involved therewith.

Furthermore, customers of electronic shopping services can access the service by calling a dial up telephone line and accessing an electronic data base describing different products for sale. The consumer could browse through the data base while being on line with the electronic shopping service computer system. Once a product is selected by the consumer, such as by entering a selection into the electronic shopping service computer system, the purchase demand is logged in the central computer system for subsequent processing and delivery of the product to the consumer. The consumer would be subsequently billed for the purchase along with the delivery of the product. This type of on line shopping service is much like dialing one of the conventionally available 800 telephone lines to request purchase of a product. But, by using an electronic data base as opposed to talking to a human operator answering an 800 telephone line, it allows the consumer to browse on line through the data base and make a selection. Unfortunately, this type of service requires a caller to be connected on line with the service while browsing and making the purchase selections. This takes significant amounts of resources at a centralized computing system to handle the incoming calls, browsing over available products, and logging customer selections for subsequent delivery to the customers.

Additionally, electronic mail networks are becoming commonly available to network users with a proper hardware and software. Typically, a user of the electronic mail (E-mail) system can down load custom forms from a central E-mail distribution center and then can select and modify one of the forms with a personal message. The individual can then send out the personalized form as an electronic mail message to a receiving party on the network. Regrettably, once an individual has down loaded into their computer any type of custom forms, such as by electronic communication or by a medium such as a floppy diskette, the individual can duplicate the custom form and utilize the product as many times as desired without a mechanism for compensating the person who did the original artwork and creative work on the custom form. Hence, there is no mechanism for the sellers of the custom form to get paid for their work according to the number of copies that are utilized by a consumer.

Therefore, with the increasing popularity of personal communicators and the availability of an electronic mail networks, there is a need for allowing consumers of greeting cards to more easily shop for the greeting cards, add personal messages to the greeting cards, and deliver the greeting cards to a receiving party, while allowing the original artist to be more fairly compensated for the products that they distribute to consumers.

SUMMARY OF THE INVENTION

In carrying out one form of this invention, there is provided an electronic greeting card communication system and a method therefor, the electronic greeting card communication system comprising a first personal communicator, an electronic mail server, and a second personal communicator.

The first personal communicator accepts off-line selection of an electronic greeting card from a user, and then transmits a request message corresponding to the off-line selection of the electronic greeting card, the request message including at least an electronic greeting card identifier and a destination identifier. The electronic mail server receives the request message, and processes the request message by wireless transmission of an electronic greeting card message to the second personal communicator. The electronic greeting card includes a representation of an electronic greeting card image being identified by the electronic greeting card identifier. The second personal communicator is also identified by the destination identifier included with the request message. The electronic mail server updates billing information associated with an account of the first personal communicator in response to the electronic greeting card message being transmitted for billing the user of the first personal communicator therefor.

The second personal communicator comprises a selective call receiver for receiving the wireless transmitted electronic greeting card message. The second personal communicator presents the electronic greeting card message, including an electronic greeting card image corresponding to the representation thereof included with the electronic greeting card message, to a user.

DESCRIPTION OF THE PREFERRED EMBODIMENTS

Figure 1:
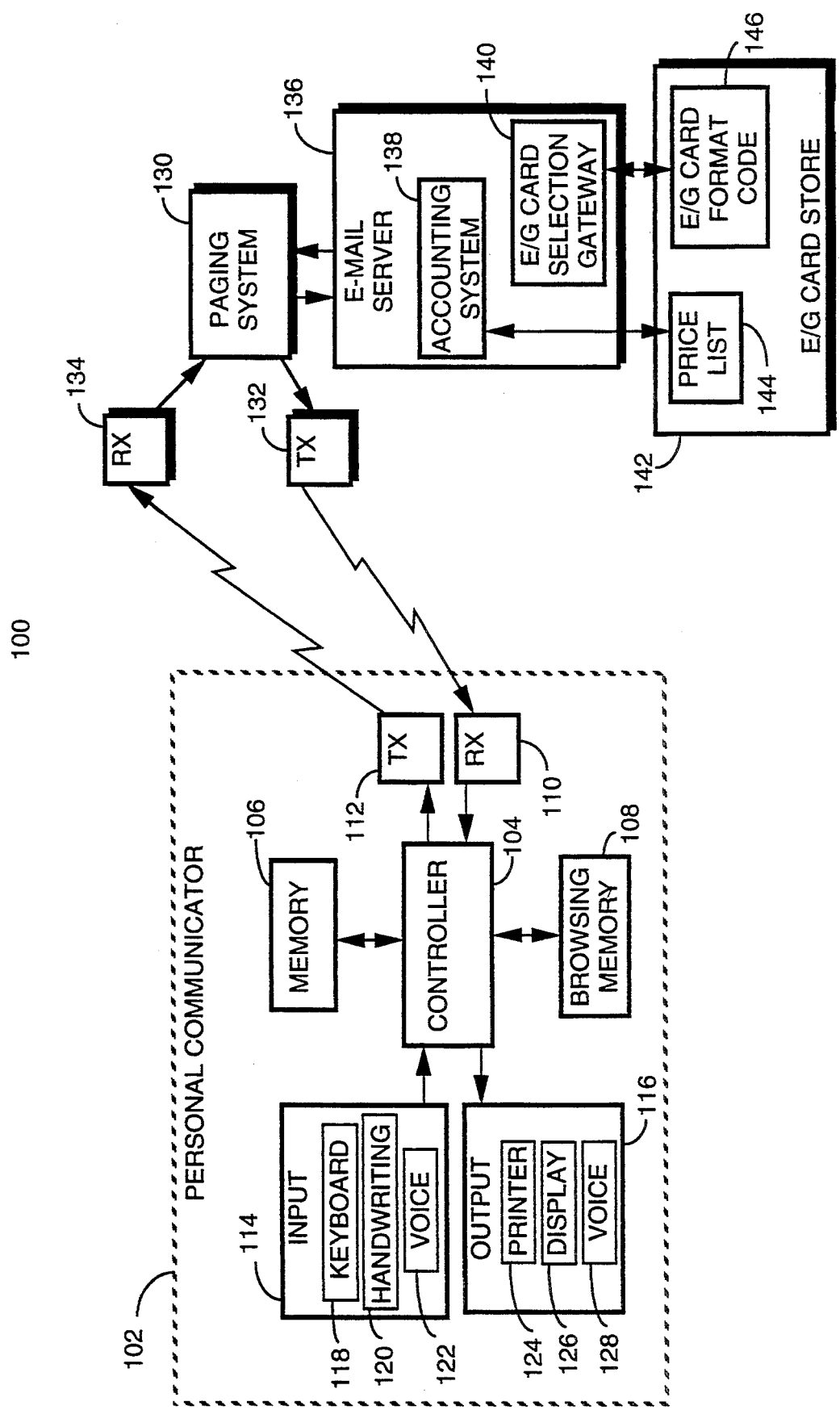
FIG. 1 is a block diagram of a communication system according to the preferred embodiment of the present invention.

FIG. 1 illustrates a communication system 100 according to the preferred embodiment of the present invention. A personal communicator 102 is preferably a portable device which can be carried by a person while freely roaming over a geographic area. The personal communicator 102 can communicate through wireless transmissions with a central electronic mail communications system. Specifically, the personal communicator 102 can transmit messages to the central system and can receive messages from the central system. The communication is preferably effected by using radio transmissions between the personal communicator 102 and the central system. However, other means of wireless communication are contemplated within the scope of the present invention, including microwave communication, satellite communication, infrared communication, ultra sound communication, and other forms of wireless communication which allow the personal communicator 102 to freely roam while communicating with the central system. Of course, wire line communication, including utilizing dial-up telephone lines through the public switched telephone network (PSTN), may also be utilized for communicating messages between the personal communicator 102 and the central system. In this latter case, the personal communicator 102 may utilize modem communication to communicate messages with the central system.

The personal communicator 102 comprises a controller 104 for controlling the functions of the personal communicator 102, which is coupled to a memory 106 for storing information as necessary by the controller 104. Additionally, a browsing memory 108, preferably a non volatile memory, stores one or more data bases of information for the personal communicator 102 as will be discussed below. The browsing memory 108 preferably is a large non-volatile memory device, such as a hard disk unit, a CD-ROM unit, or other large storage device. The controller 104 is coupled to the browsing memory 108 for accessing the information stored in the one or more data bases located in the browsing memory 108. The controller 104 is coupled to a radio transmitter 112 for transmitting messages to the central communication system, and it is coupled to a radio receiver 110 for receiving messages from the central communication system. Further, the personal communicator 102 preferably includes one or more input devices 114 which are coupled to the controller 104 for receiving input from a user of the personal communicator 102. For example, user input can be received by means of a keyboard 118 which is coupled to the controller 104. Also, a digitizing tablet and stylist may constitute a hand writing input means 120 which is coupled to the controller 104 for receiving hand written information from a user of the personal communicator 102. Further, the users voice may be received through a microphone and voice digitizing module 122 which is coupled to the controller 104 for receiving voice messages from the user of the personal communicator 102.

The personal communicator 102 includes one or more output devices 116 coupled to the controller 104 for presenting information to the user of the personal communicator 102. For example, a high resolution printer 124 can be coupled to the controller 104 for printing hard copy to communicate information to the user of the personal communicator 102. Also, a high resolution liquid crystal display 126 can be coupled to the controller 104 for displaying information on the display to be read by the user of the personal communicator 102. Furthermore, a sound output device 128, such as a speaker and speaker driving circuitry can be coupled to the controller 104 for providing audible information for the user of the personal communicator 102. For example, the controller 104 may couple digitized voice message information through the voice output device 128 to present a voice message to the user of the personal communicator 102, as will be discussed below.

A paging system 130 is coupled to one or more transmitter sites 132 for transmitting messages to the personal communicator 102. Further, the paging system 130 can be coupled to one or more receiver sites 134 for receiving messages transmitted by the personal communicator 102. A paging system of the general type for transmitting messages to personal communicators 102 and for receiving message therefrom is more fully discussed in U.S. Pat. No. 5,138,311 by Weinberg entitled, "Communication System Having Adaptable Message Information Formats" which is assigned to the same assignee as the present invention and is incorporated herein by reference. Additionally, exemplary communication systems for sending messages to communication receivers and for receiving messages therefrom are more fully discussed in the following copending U.S. patent applications:

1) U.S. patent application Ser. No. 07/963,370, now U.S. Pat. No. 5,396,537 by Robert J. Schwendeman, entitled "Reliable Message Delivery System";
2) U.S. patent application Ser. No. 07/954,634, now U.S. Pat. No. 5,394,560 by John Richard Kane, entitled "Nationwide Satellite Message Delivery System";
3) U.S. patent application Ser. No. 07/954,106, now U.S. Pat. No. 5,315,635 by Kane et al., entitled "Reliable Message Communication System"; and
4) U.S. patent application Ser. No. 07/954,179, now abandoned by John Richard Kane, entitled "Electronic Mail Message Delivery System"; and which are all commonly assigned to the same assignee as the present invention and the teaching of which are incorporated herein by reference.

The paging system 130 is coupled to a central electronic mail server 136 which preferably includes a computer data base for maintaining an accounting system 138 to keep track of, for example, billing information for individual users of personal communicators 102 associated with the electronic mail communication system. Additionally, the accounting system data base 138 can maintain a separate sub data base for keeping track of electronic greeting cards (E/G cards) which are available to consumers that are associated with the electronic mail communication system. This data base may comprise information for each electronic greeting card that identifies the originating source of the greeting card, the most recent pricing information available for the greeting card, and possibly a low resolution digital representation of the greeting card as well as other information for identifying the electronic greeting card in the electronic mail communications system such as a catalog ID. The electronic mail server 136 also includes an electronic greeting card selection gateway 140 which incorporates an interface for communicating with one or more electronic greeting card stores 142. The gateway 140 preferably also includes a computer data base identifying interfacing information for accessing the one or more electronic greeting card stores 142 through the interface. Additionally, in the preferred embodiment, the accounting system 138 also maintains a high quality digital representation of the individual electronic greeting cards which will be available to send through the paging system 130 to the personal communicators 102 as will be more fully discussed below. Each electronic greeting card store 142 may comprise a computer data base system for keeping track of pricing information, such as in a price list 144, which is associated with electronic greeting card format information 146 for each of the electronic greeting cards available from that particular greeting card store 142. Periodically, the electronic mail server 136 can communicate with the electronic greeting card store 142, such as by the electronic greeting card selection gateway 140 accessing the electronic greeting card store 142 through a computer or telephone dial-up interface. Once the electronic mail server 136 is communicating with the electronic greeting card store 142 updated information from the electronic greeting card store 142 can be down loaded to the accounting system 138 and the electronic greeting card selection gateway 140 in the electronic mail server 136. This updated information may include pricing information from the price list 144 and electronic greeting card format information 146 from the computer data base at the electronic greeting card store which represents possibly new selections of electronic greeting cards available from that electronic greeting card store 142 or a change in pricing information. In this way, the central electronic mail server 136 can maintain current information regarding electronic greeting cards available to consumers which are subscribers of the electronic mail communication system. Typically, these consumers would be users of personal communicators 102 that can transmit and receive messages in the electronic mail communications system 100. As new providers of an electronic greeting card become members of the electronic mail communication system 100 they can establish electronic greeting card stores 142 with their own digital representations of electronic greeting cards available to consumers. Preferably, each electronic greeting card representation from the electronic greeting card store includes a low resolution digital representation of the electronic greeting card image and a separate high resolution representation image which is the final product. This information is stored in the computer data base maintaining the electronic greeting card format codes 146 for the electronic greeting card store 142. Other identifying information, such as a product identification and vendor number may also be maintained with the electronic greeting card format codes 146. Also, pricing information associated with each electronic greeting card is maintained in a price list 144 in the computer data base for the electronic greeting card store 142. This collection of information representing an individual electronic greeting card available from an electronic greeting card store 142 is communicated through the computer interface to the electronic mail server 136 and stored in the corresponding data base 138 to make the product available to consumers subscribing to the electronic mail communication system 100.

An electronic greeting card preferably is a digital representation of a graphical image which communicates a message to a user of the personal communicator 102 when, for example, displayed on a viewing display or when printed as hard copy. The graphical image may include text information to be ready by the recipient of the message. Further, the graphical information may optionally be represented as a hologram image to the final recipient of the message which gives a three dimensional effect to the image for providing a realistic appearance to the image as viewed by the recipient of the message.

A person can send an electronic greeting card to another person where both persons have their own personal communicator 102 and subscribe to the electronic mail communication system 100. According to the present invention, the sending parties personal communicator 102 includes the browsing memory 108 coupled to the controller 104. The browsing memory 108 preferably contains a collection of electronic greeting cards organized in a data base. By entering user input, such as through the keyboard 118, the sending party can browse through the available electronic greeting cards in the browsing memory 108 and make a selection of one electronic greeting card for sending to the receiving party. For example, user input accepted through the keyboard 118 can step through, or browse through, the available electronic greeting cards in the browsing memory 108 by having the controller 104 sequentially send the digitized pattern of the electronic greeting card to an output device, such as the display 126. Once the user viewing the display 126 selects an electronic greeting card being displayed, such as by entering user input at the keyboard 118, the personal communicator 102 may prompt the user to additionally enter a personal message to the selected electronic greeting card to create a personalized electronic greeting card for sending to a receiving party. The personalized message can be, for example, a type written message entered through the keyboard 118. Alternatively, the personalized message can be hand written using the stylist and electronic tablet 120 for digitizing the handwritten message for coupling with the electronic greeting card. A third alternative allows the user to enter a voice message through the voice input device 122 which is digitized and coupled to the electronic greeting card in memory 106. These are just examples of personal messages that a user can attach to the electronic greeting card, and other types of input devices 114 may be used to enter a personal message which is coupled with the electronic greeting card for sending to a receiving party.

Once the electronic greeting card has been personalized with a personal message entered by the user, user input at the keyboard 118 can instruct the personal communicator 102 to send a request to the electronic mail server 136 for sending the electronic greeting card to a receiving party. The format of this request message and the protocol used for communicating between the personal communicator 102 and the electronic mail server 136 is discussed below. After the electronic mail server 136 receives the request it processes the request by updating billing information in the accounting system 138 for the sending parties account and then can prepare to send the final high quality electronic greeting card to a receiving party who is also equipped with a personal communicator 102. The electronic mail server 136 can send one or more messages to a receiving personal communicator 102 through the paging system 130 to deliver the electronic greeting card with the personal message to the requested destination. The receiving personal communicator 102 would receive the message (or messages) to store the received electronic greeting card in memory 106 once the personal communicator 102 has received the electronic greeting card and has stored it in memory 106 it may alert the user of the receiving personal communicator 102 that a message has been received. The receiving party may then enter user input, such as via the keyboard 118, to instruct the personal communicator 102 to present the electronic greeting card with the personal message through the output device 116, e.g., the display 126, the printer 124, or the voice output device 128. The receiving personal communicator 102 is not necessarily equipped with a browsing memory 108. The received electronic greeting card is stored in memory 106 in its high resolution format and no local data base of electronic greeting cards is required.

The graphics image and other associated information of the received electronic greeting card preferably is in a compressed format, such as by using fractal compression techniques. A compression approach more efficiently utilizes the communication medium between the electronic mail server 136 and the personal communicator 102 by requiring less data to be transmitted with the message to completely represent the graphics image and other associated information when the electronic greeting card is expanded for presentation to a user of the personal communicator 102. The compression approach also requires less memory 106 to store the electronic greeting card in the receiving personal communicator 102. A compression approach suitable for use in compressing and expanding graphical images is disclosed in U.S. Pat. No. 5,065,447, entitled "Method And Apparatus For Processing Digital Data", by Barnsley et al.

Preferably, high resolution images for the electronic greeting cards can be stored in advance in a compressed form and organized in a library for easy access and retrieval, which is preferably located at the central electronic mail server 136. The compressed image of an electronic greeting card is transmitted along with the electronic greeting card. Then, at the receiving personal communicator 102 the image is decompressed (expanded) to its full information content which can be displayed as a high resolution image. Since the compression is done in advance, it is more suitable to use an asymmetric image compression/expansion technique. That is, the compression process of the techniques is more complex than the expansion process. The preferred technique for this compression/expansion approach involves using a fractal transform based image compression/expansion technique. In this technique the compression part is computationally expensive (requires a lot of computer processing power) while the image decompression (expansion) is very simple and can be done by the personal communicator 102 in real time. Another advantage of using fractal techniques is that certain images lend themselves naturally to fractal representation such that the compression ratio can be extremely high which results in significant efficiencies in both memory utilization and communication throughput because the compressed images can constitute very small messages. A supplier of a compression/decompression system using the fractal transform approach is Iterated Systems, Inc., located in Norcross, Ga., U.S.A. The product is called "Images Incorporated". It supports a number of formats for digital information files (expanded form) that can be displayed, such as on the high resolution liquid crystal display 126, or printed out, such as using the high resolution printer 124.

An alternative asymmetric image compression/decompression technique is provide using Vector Quantization. The compression procedure consists of searching in a predesignated code book of 4 by 4 blocks of pixels to find the best match for each 4 by 4 block of the image. The address of the code word is then transmitted as a compressed representation of the image. Since both the transmitter and receiver have the same code book, the decompression procedure involves looking up in the code book the received address to retrieve the 4 by 4 block of the image and reconstructing the image from the code words from the code book.

In summary, after an electronic greeting card is received and stored in memory 106 the controller 104 may operate to decompress the graphically image of the electronic greeting card and feed the final image with the personal message to the output device 116 for presenting the electronic greeting card and message to the user of the receiving personal communicator 102, as will be more fully discussed below.

Figure 2:
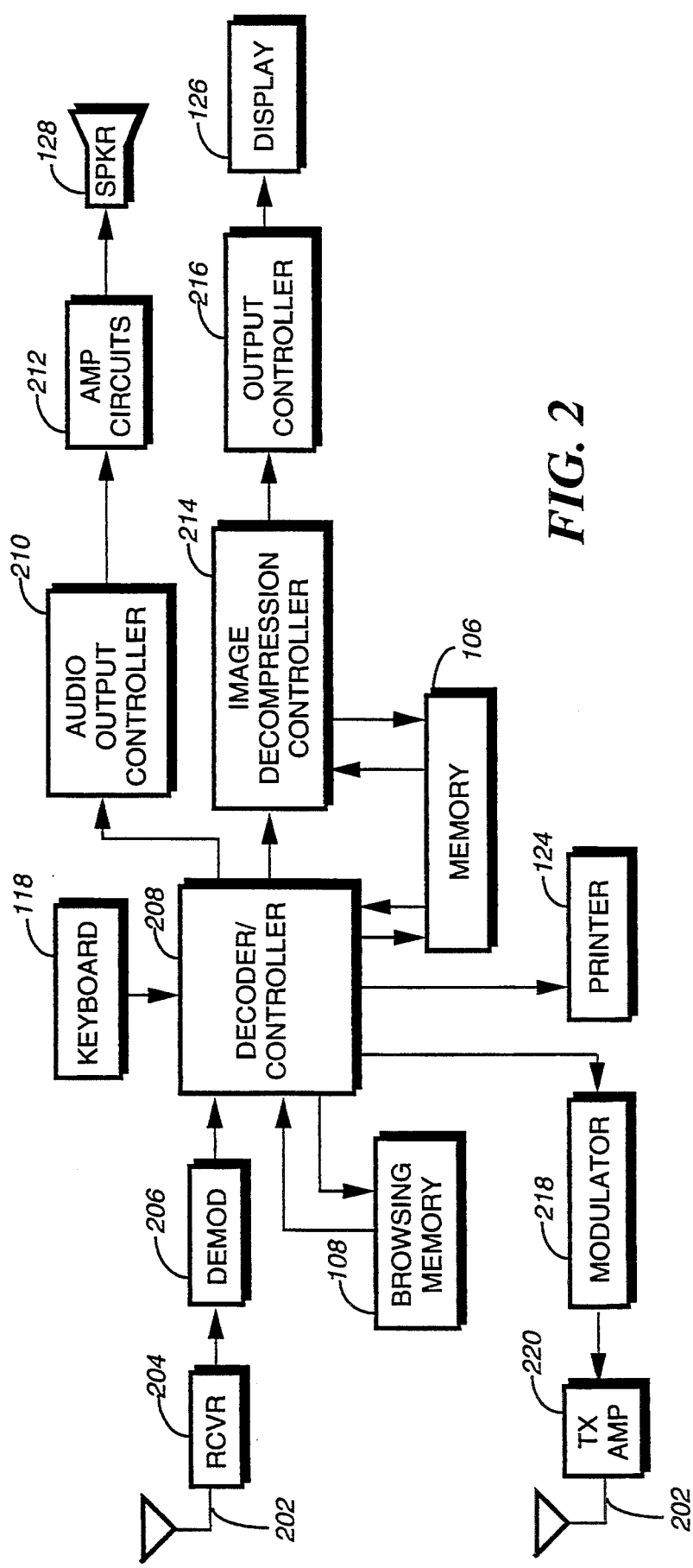
FIG. 2 is an electrical block diagram of a personal communicator according to the preferred embodiment of the present invention.

FIG. 2 is a more detailed block diagram of an exemplary personal communicator 102 according to an embodiment of the present invention. This exemplary personal communicator 102 can receive messages from the electronic mail communication system 100 through an antenna 202 coupled to receiving circuitry 204. The receiving circuitry 204 is coupled to a demodulating circuitry 206 which is coupled to the decoder/controller 208. The controller 208 is coupled to the memory 106. Optionally, the personal communicator 102 can include a browsing memory 108 which stores the collection of electronic greeting cards for sending to another personal communicator 102 in the electronic mail communications system 100. The keyboard 118 is coupled to the controller 208 and allows the user of the personal communicator 102 to enter commands and other input to the personal communicator 102. Additionally, an audio output controller 210 is coupled to the decoder/controller 208 and can receive digitized audio which converts to an analog signal and then couples the signal to audio amplifying circuits 212 which then couple the signal to a speaker 128 for providing audible messages to the user of the personal communicator 102. Also, the audio output controller 210 can couple an alert tone signal or other indicating signal to the user of the personal communicator 102, as necessary. The decoder/controller 208 is coupled through a printing service 124 for providing a hard copy printout to the user of the personal communicator 102. For example, the electronic greeting card can be printed by high resolution printer 124 and presented to the user of the personal communicator 102. An image decompression controller 214 is coupled to the memory 106 for decompressing a received electronic greeting card image and combining the decompressed image with a displayable personal message such as a text or a hand written personal message. The combined electronic greeting card image and displayable personal message may be fed from the image decompression controller 214 to a display output controller 216 which then couples control signals to a display 126, such as a high resolution liquid crystal display 126 for displaying the electronic greeting card with the personal message. Further, the controller 208 can communicate with the image decompression controller 214 and can instruct the image decompression controller 214 to decompress the image and prepare the electronic greeting card with message in memory 106 for subsequent print out at the high resolution printing device 124. When the image decompression controller 214 has prepared the electronic greeting card with message it can hand shake back to the decoder/controller 208 that the electronic greeting card and message are ready to be printed out. The controller 208 then can send the proper controls to the printing device 124 to render a hard copy print out of the electronic greeting card with the personal message for the user of the personal communicator 102.

For transmitting a request to send an electronic greeting card the personal communicator 102 includes a modulator circuit 218 coupled to the controller 208. The modulating circuit 218 is coupled to a transmitting amplifier circuit 220 which is coupled to the antenna 202 for transmitting a request message to the electronic mail communication system 100. The user of the personal communicator 102 can enter selection by user input through the keyboard 118. The selected electronic greeting card is normally stored in the browsing memory 108. It is stored in the browsing memory 108 along with other identifying information. Once the selection is made the controller 208 can retrieve the associated identifying information and can format a request message for sending the electronic greeting card to a particular receiving party. Once the request message has been formatted by the controller 208, the controller 208 couples the request to the modulating circuit 218 which then couples the modulated signal to the transmitter 220. The request message is then transmitted from the antenna 202 for reception by the receiver 134 (FIG. 1) of the electronic mail communication system 100.

Preferably, the collection of electronic greeting cards in the browsing memory 108 are stored in a low resolution mode such that the user of the personal communicator 102 can view the image of the electronic greeting card on the display 126, for example, with sufficient clarity to make a selection. However, by storing in the browsing memory 108 only the low resolution electronic greeting card images it helps prevent theft and counterfeiting because the user of the personal communicator 102 does not have access to the high resolution electronic greeting card image which is ultimately sent to the receiving party. That high resolution image is stored at the central electronic mail server 136. Therefore, the user of the sending personal communicator 102 can view a low resolution image of the electronic greeting card, make a selection based on that low resolution image, optionally append a personal message to the electronic greeting card, designate the destination or receiving personal communicator 102 for the message, and then instruct the sending personal communicator 102 to send the request message to the electronic mail communication system 100.

Figure 3:
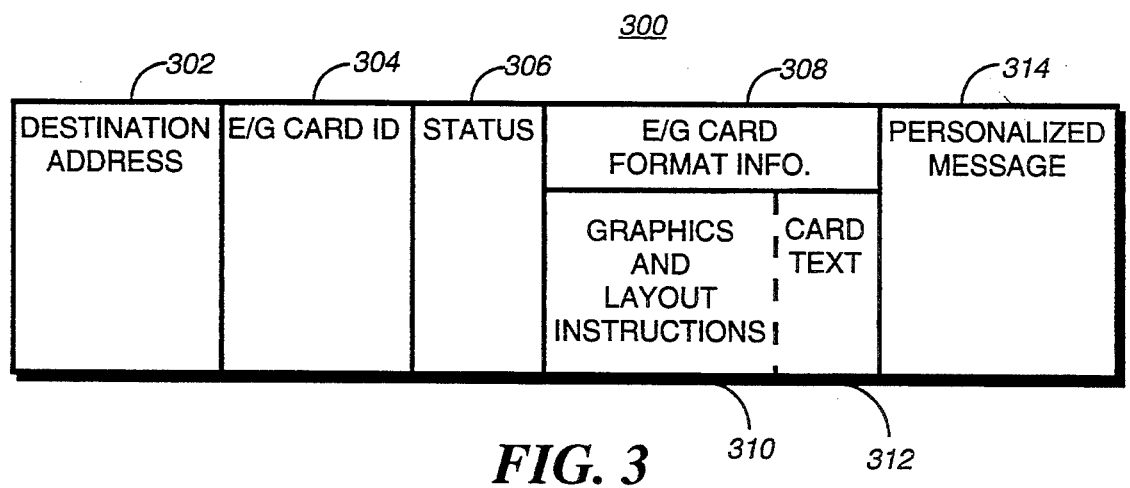
FIG. 3 is a timing diagram illustrating an exemplary message format according to the preferred embodiment of present invention.

As shown in FIG. 3, the request message 300 comprises a number of component parts for making a complete request to send an electronic greeting card to a receiving party. The destination address 302 identifies the personal communicator 102 of the receiving party. The electronic greeting card identifier 304 identifies the specific electronic greeting card to the electronic mail server 136. This ID 304 resides in the browsing memory 108 as well as in the computer data base accounting system 138 in the electronic mail server 136. Hence, the request message 300 does not have to include the actual graphics image representing the selected electronic greeting card. By not requiring the graphically image of the electronic greeting card to be sent with the request message 300 it helps increase throughput of the communication system and better utilizes the communication medium between the personal communicator 102 and the central electronic mail server 136.

Figure 4:
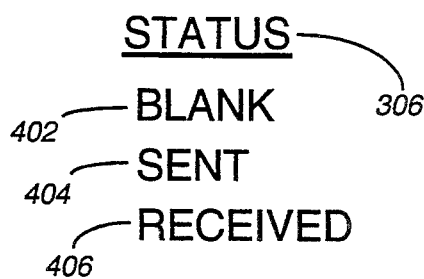
FIG. 4 is a status table utilized in the preferred embodiment of the present invention.

A status field 306 indicates the type of message this is. For example, as shown in FIG. 4, the status field 306 may be a blank electronic greeting card 402, a sent electronic greeting card 404 or a received electronic greeting card 406. The blank electronic greeting card 402 is an electronic greeting card typically being sent from the central electronic mail server 136 for distribution to the personal communicators 102 in the electronic mail communication system 100 that have a browsing memory 108. The blank electronic greeting card has no personal message attached thereto and is a low resolution image with sufficient quality for the user of the personal communicator to view the image of the electronic greeting card, such as on the display 126 to make a selection. The sent electronic greeting card 404 indicates a request message which is typically sent from a personal communicator 102 to the central electronic mail server 136. Lastly, the received electronic greeting card 406 indicates that the message is destined to be received (or has been received) by a personal communicator 102.

An electronic greeting card having a sent status 404 may optionally include formatting information 308 which includes graphics and layout instructions 310 and possibly card text 312. The sent electronic greeting card would include the formatting information 308 where the electronic mail communication system 100 would have the final high quality electronic greeting card image stored in the local browsing memory 108 of the sending personal communicator 102. In this case, a selection by the user of the personal communicator 102 could invoke the controller 208 to retrieve a high resolution image from the browsing memory 108 and couple the personal message thereto for sending the request message to the electronic mail server 136.

An electronic greeting card having a received status 406 typically would include formatting information 308 comprising the high resolution graphics and layout instructions 310 and possibly the text information 312 that is destined to be received by the receiving personal communicator 102 and presented to the receiving party. The electronic greeting card having a received status 406 would also include the personalized message 314. Similarly, the electronic greeting card having the sent status 404 would also include the personalized message 314.

The electronic greeting card having a blank status 402 however would not include a personalized message 314 because this electronic greeting card is sent from the electronic mail server 136 to the personal communicator 102 to update the browsing memory 108 with a new electronic greeting card for possible use by the user of the personal communicator 102. That is, the blank electronic greeting card is virgin and may be subsequently used by a sending party.

Other information may be included with the electronic greeting card as part of the communication protocol between personal communicators 102 and the electronic mail communication system 100. For example, originator information may be included with the electronic greeting card to identify the originating party of the message. Further, intermediate addressing information and possible error correction information may be included with the messages to facilitate communication between the personal communicator and the central electronic mail server 136.

A conventional communication protocol, such as 1200 baud Post Office Code Standardization Advisory Group (POCSAG), may be used for sending messages between the personal communicator 102 and the central paging system 130. The messages could then be coupled between the paging system 130 and the electronic mail server 136. Hence, a transaction for sending an electronic greeting card to a receiving party may be consummated in the following way. First, a sending party can enter commands to the sending personal communicator 102, such as through the keyboard 118, and browse through possible choices of electronic greeting cards in the browsing memory 108. The images of the electronic greeting cards could be displayed on the display device 126. Once the user selects one of the displayed electronic greeting card images, the user can then enter a personal message to attach to the selected electronic greeting card. For example, the user could type on the keyboard 118 a simple personal message that would be attached to the selective electronic greeting card for sending to a receiving party. The user can then enter information at the keyboard 118 to identify the destination personal communicator 102 and then can instruct the sending personal communicator 102 to send the request message to the central electronic mail server 136. The sending personal communicator 102 would format a request message, such as shown in FIG. 3, which would include, for example, a destination address 302, an electronic greeting card ID 304, a sent status 306, and the personalized message 314. Note that the electronic greeting card format information 308 is not necessary when the central electronic mail server 136 is the depository of the high resolution graphical images of electronic greeting cards. The sending personal communicator 102 then can send the request message to the central electronic mail server 136.

Once the electronic mail server 136 receives the request message from the sending personal communicator 102, the electronic mail server 136 can update billing information in the accounting system computer data base 138 to charge the appropriate amount of money for the electronic greeting card to the sending parties account in the accounting system 138. Also, the electronic mail server 136 can communicate with the electronic greeting card store 142 and let the electronic greeting card store know that a monetary fee for using their electronic greeting card will be paid accordingly. Hence, billing information is maintained at the electronic mail server 136 in the accounting system 138 to bill the subscriber of the service as well as billing information is sent to the affiliated electronic greeting card store 142 to allow the electronic greeting card store 142 to maintain billing information on their particular electronic greeting cards which are being purchased.

The electronic greeting cards store 142 will receive payment for the electronic greeting card that is being used by the sending party who is being billed by the electronic mail server 136. This billing information can be updated and officially maintained in computer data bases in the electronic mail server 136 and in the electronic greeting card store 142. Subsequently, to updating billing information, the electronic mail server 136 can format an electronic greeting card message to send to the final receiving personal communicator 102. The electronic greeting card would comprise, as shown in FIG. 3, a destination address 302, optionally an electronic greeting card ID 304, a status field 306 which is set to a receive status 406, the electronic greeting card format information 308 which can include the high resolution graphics and layout instructions 310 and possibly card text 312, and the personalized message 314. The electronic mail server 136 then sends the electronic greeting card message to the receiving personal communicator 102, preferably through the paging communication system.

Once the receiving personal communicator 102 receives the electronic greeting card message it can store the message in memory 106. Subsequently, the personal communicator 102 may alert the user, such as with an alert tone from the speaker 128, that a message has been received. The user can then enter user input, such as through the keyboard 118, to receive the electronic greeting card message from the personal communicator 102. That is, the personal communicator 102 may present the visible message via the display 126, and may present an audible personal message, if so included with the electronic greeting card, from the speaker 128. In this way, the receiving party can retrieve the received electronic greeting card message from the receiving personal communicator 102.

Figure 5:
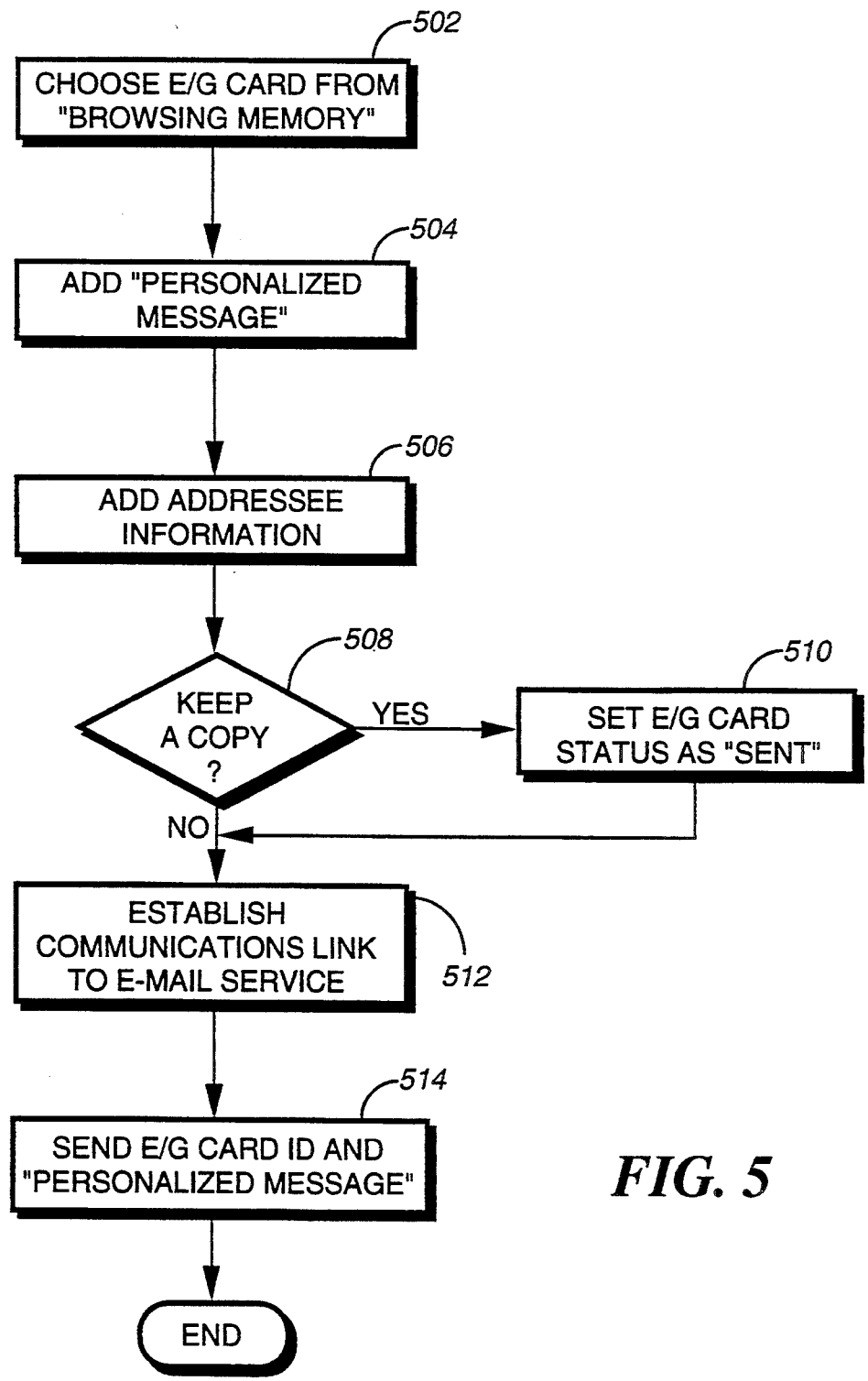
FIG. 5 low diagram illustrating an operational sequence for a personal communicator according to the preferred embodiment of the present invention.
Figure 6:
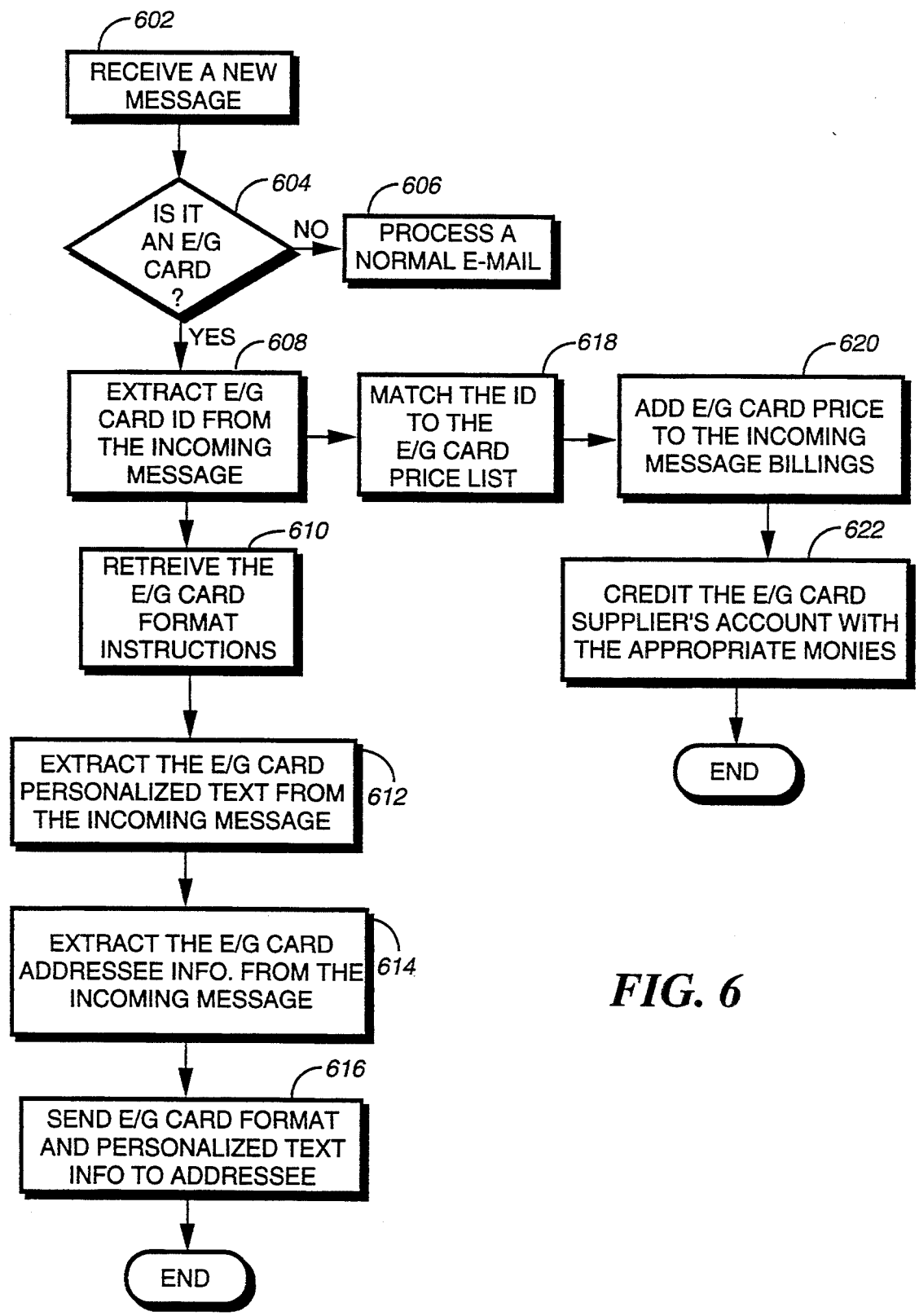
FIG. 6 is a flow diagram illustrating an operational sequence for the communications system of FIG. 1 according to the preferred embodiment of the present invention.
Figure 7:
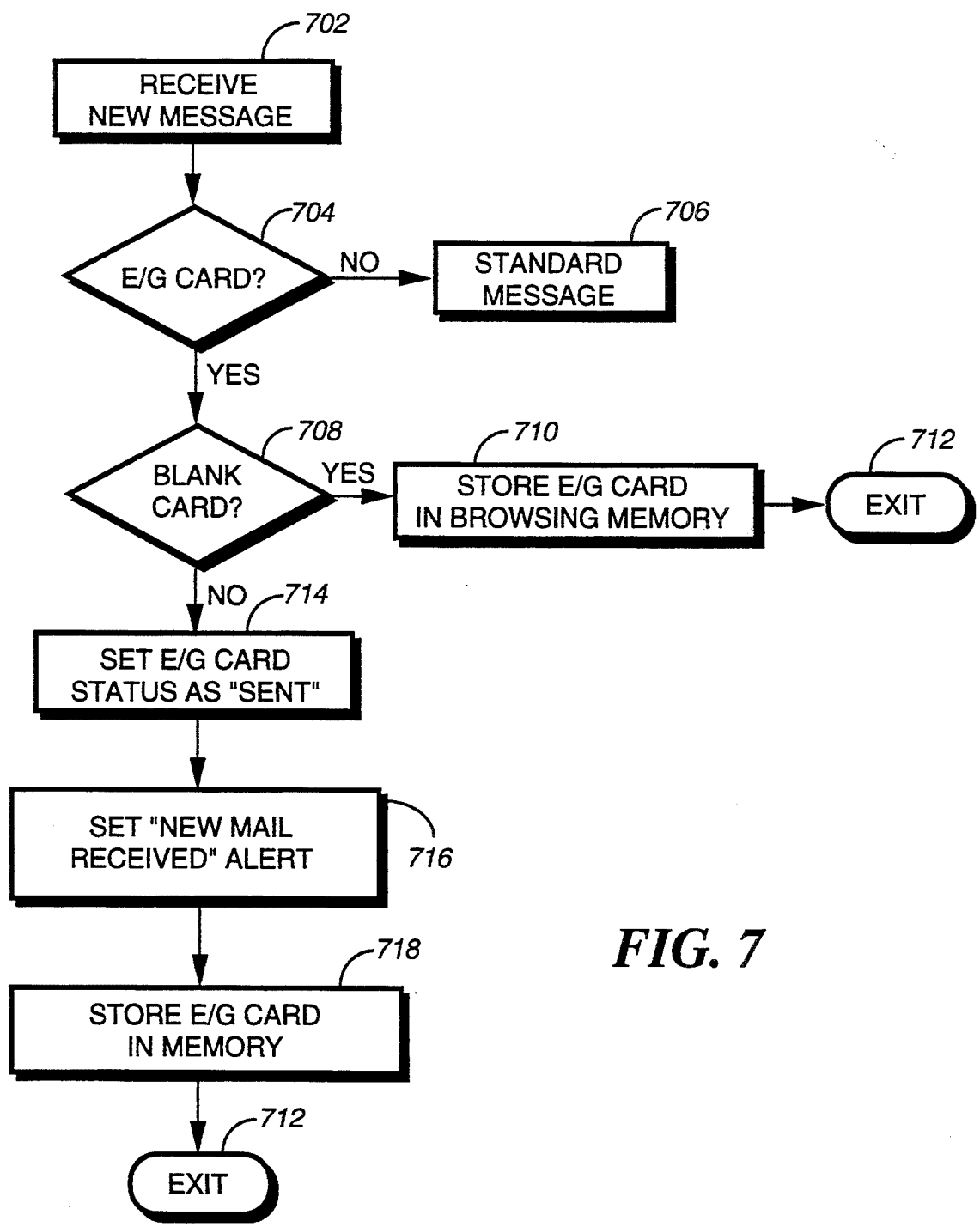
FIG. 7 is a flow diagram illustrating an operational sequence for receiving a message in a personal communicator according to the preferred embodiment of the present invention.
Figure 8:
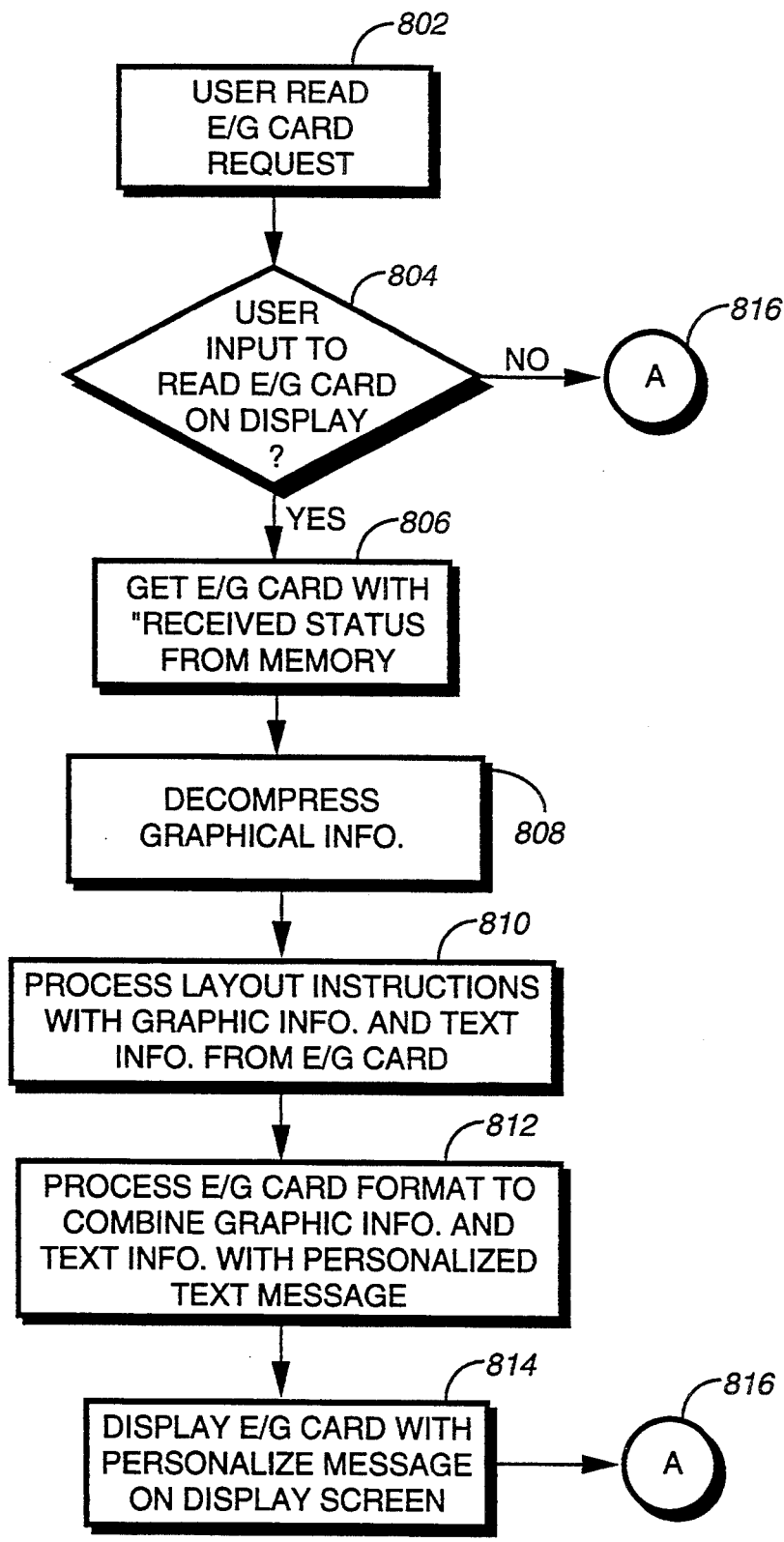
FIGS. 8 and 9 comprise a flow diagram illustrating an operational sequence for presenting a message to a user of a personal communicator according to the preferred embodiment of the present invention.
Figure 9:
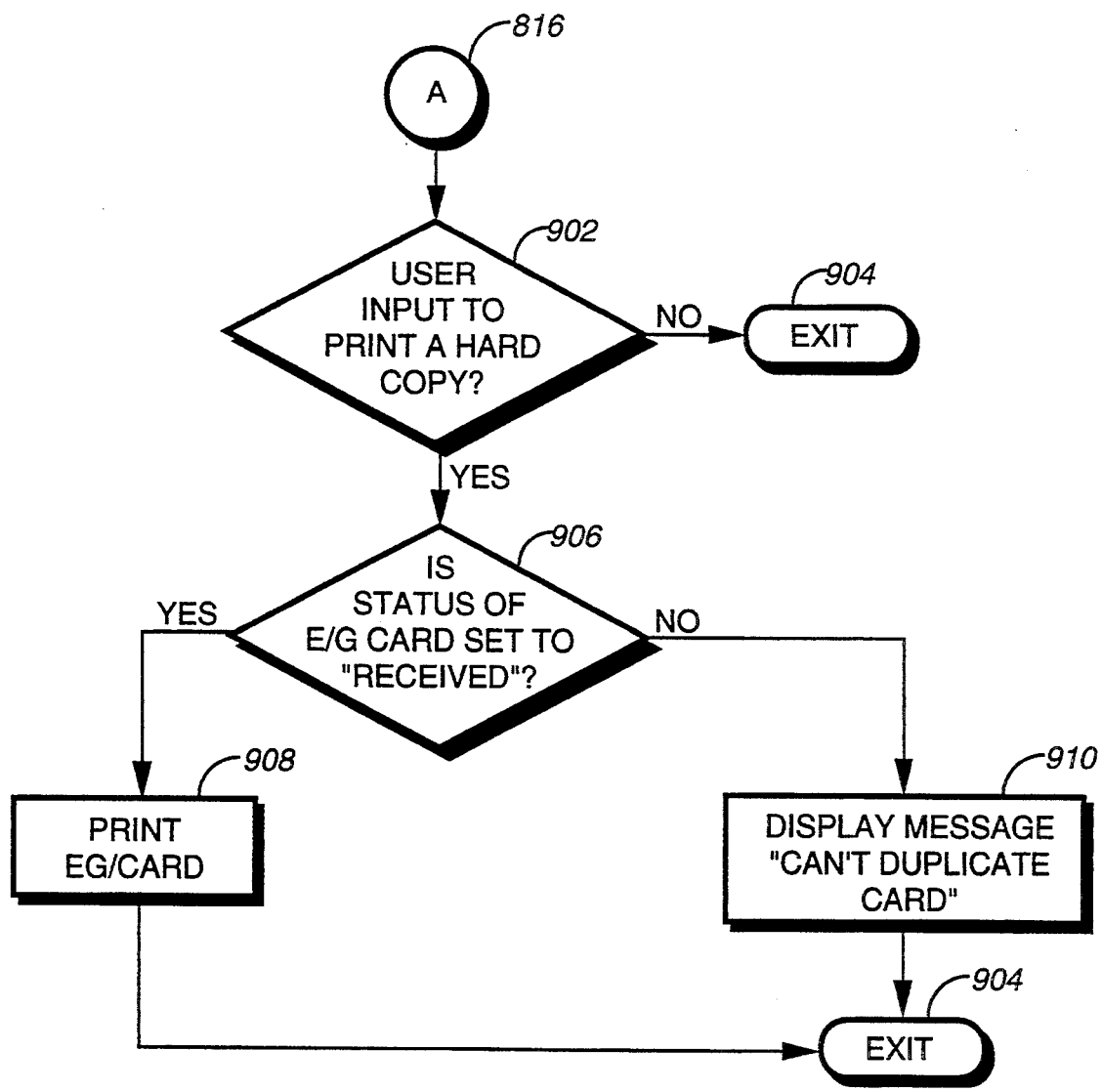

FIG. 5 illustrates an operational sequence for the sending personal communicator 102. FIG. 6 illustrates an operational sequence for the electronic mail server 136. FIGS. 7, 8 and 9 illustrate operational sequences for the receiving personal communicator 102. These flow diagrams will be discussed below in the context of a sending party wishing to send an electronic greeting card through the electronic mail communication system 100 to a receiving party, where both sending and receiving parties are equipped with personal communicators and subscribe to the electronic mail service.

Referring to FIG. 5, the user of the personal communicator 102 wishing to send an electronic greeting card will first typically browse through the browsing memory to select an electronic greeting card from the browsing memory, at step 502. Next, the user can enter a personalized message, at step 504, that will be coupled with the electronic greeting card for presentation to a receiving party. The user then will enter destination information, at step 506, to identify the receiving personal communicator 102. The user of the personal communicator 102 can then determine, at step 508, whether to keep a copy of the electronic greeting card. If a user elects to keep a copy, at step 510, the copy is stored in the memory 106 with a status field set to sent. Otherwise, the user can elect not to keep a copy, at step 508. Then, the personal communicator 102 establishes a communications link to the electronic mail communication system 100, at step 512. The personal communicator 102 can then send the request message including the personalized message information to the central electronic mail server 136, at step 514.

Referring to FIG. 6, the central electronic mail communication system 100 receives the request message, at step 602. If the received message is determined not to be an electronic greeting card message, at step 604, the electronic mail server 136 processes the message as a normal electronic mail message, at step 606. If it is an electronic greeting card message, at step 604, the electronic mail server 136 extracts the electronic greeting card ID field from the incoming message, at step 608. The electronic mail server 136 then performs two parallel operational sequences as will be discussed below. The first sequence after extracting the electronic greeting card ID from the incoming message, at step 608, includes retrieving the electronic greeting card formatting instructions, at step 610, that may be stored in a computer data base 138 in the electronic mail server 136. Next, the electronic mail server 136 extracts the electronic greeting card personalized text from the incoming message, at step 612. Then, the electronic mail server 136 extracts the destination address information from the incoming message, at step 614. The electronic mail server 136 can now combine all the necessary information for sending an electronic greeting card to the receiving personal communicator 102. Hence, at step 616, the electronic mail server sends an electronic greeting card including the high resolution graphics image and text coupled with the personalized message to the receiving personal communicator 102 as identified by the address information from the request message. The second operational sequence performed by the electronic mail server 136 after extracting the electronic greeting card identification from the incoming message, at step 608, includes matching the identification to the electronic greeting card price list, at step 618. This verifies the billing information for the selected electronic greeting card. Next, the electronic mail server 136 updates the billing information, at step 620, to the account of the sending party, as stored in the accounting system 138. Additionally, the electronic mail server 136 credits the electronic greeting card suppliers account with the appropriate moneys payable for the purchase of the electronic greeting card, at step 622. Hence, the supplier of the electronic greeting card is paid for each use of the electronic greeting cards that it supplies to consumers. This allows fair compensation to the originator of the electronic greeting card by the amount of purchases of consumers of the suppliers products.

Referring to FIG. 7, the receiving personal communicator 102 receives the electronic greeting card message at step 702. The receiving personal communicator 102 then determines whether the received message is an electronic greeting card, at step 704. If the received message is not an electronic greeting card, at step 704, then the personal communicator 102 processes the message as a standard received message, at step 706. Alternatively, if it is an electronic greeting card then the personal communicator 102 verifies if it is a blank greeting card, at step 708. If it is not a blank electronic greeting card, at step 708, the receiving personal communicator 102 makes certain that the status of the electronic greeting card is set to received, at step 714. The receiving personal communicator 102 then may alert the user that a new message has been received, at step 716, and then store the electronic greeting card in memory 106, at step 718. The personal communicator 102 then can exit, at step 712, the receiving routine to optionally perform other tasks as may be necessary.

If the personal communicator 102 determines that a received electronic greeting card message is a blank card, at step 708, it then stores the electronic greeting card image in the browsing memory 108, at step 710. Along with the image, the personal communicator 102 can store in the browsing memory 108 other associated information with the blank card, such as an electronic greeting card ID, pricing information, and other associated information for representing an electronic greeting card in the electronic mail communication system 100. Then, the personal communicator 102 may exit the receiving routine, at step 712, to optionally perform other tasks as may be necessary.

Referring to FIGS. 8 and 9, a user of the personal communicator 102 may initiate a request to read an electronic greeting card, at steps 802 and 804. If the personal communicator 102 receives user input requesting to display the electronic greeting card, at step 804, then the personal communicator 102 retrieves the electronic greeting card from the memory 106 verifying that the status of the message is set to received, at step 806. Next, if the graphical image of the electronic greeting card is in a compressed format, the personal communicator 102 will decompress the image, at step 808. Subsequently, the electronic greeting card layout instructions and decompress graphics and text information are formatted into a high resolution digital representation of the electronic greeting card image that will be presented to the user, at step 810. Then, at step 812, the personalized message, such as a text message, is combined with the high resolution image of the electronic greeting card to form a high resolution digital representation of the final image corresponding to the electronic greeting card with the personalized message that will be displayed to the user of the personal communicator 102. Once this is all done, the personal communicator 102 displays the electronic greeting card with the personalized message on the display 126, at step 814. The user of the personal communicator 102 can see the electronic greeting card image and read the text message associated therewith.

After displaying the electronic greeting card with personalized message, at step 814, or alternatively after determining that the user input did not request the electronic greeting card be displayed, at step 804, the operational sequence continues 816 in FIG. 9 to determine whether the user input is requesting a printed hard copy of the electronic greeting card, at step 902. If not, then the operational sequence can exit, at step 904, to optionally perform other tasks as may be necessary. If a printed copy is desired, at step 902, the personal communicator 102 may first verify that the status of the electronic greeting card is set to received, at step 906. Only received electronic greeting cards may be printed. In this way, the personal communicator 102 can limit access by the user to only the electronic greeting cards that have been personalized and paid for. If the status is set to received, at step 906, then the card is printed out, at step 908, and a hard copy is provided for the user. If the status of the electronic greeting card is not set to receive, at step 906, the personal communicator 102 displays a message on the display 126 to indicate that the electronic greeting card may not be printed, at step 910. Subsequently, at step 904, the personal communicator may exit the printing routine to optionally perform other tasks as may be necessary.

As discussed above, a sending party is able to select an electronic greeting card from a catalog of electronic greeting cards stored in a browsing memory 108. This browsing memory 108 may include blank electronic greeting cards which were delivered to the personal communicator 102 from a central electronic mail server 136. These blank cards in the browsing memory 108 may have been transferred by wireless communication between the central electronic mail communication system 100 and the personal communicator 102 or they may have been delivered by physical media such as a floppy diskette or other media. Once these blank cards are stored in the browsing memory 108 they are accessible to the user of the personal communicator 102 in making a selection for purchasing a selected electronic greeting card.

Optionally, the user can add a personalized message to the electronic greeting card before sending the card to a receiving party. In the preferred mode, the blank electronic greeting card is stored in a low resolution format in the browsing memory 108. This has the advantage of requiring less memory 108 as well as allowing more efficient utilization of the communication channel for transmitting the blank electronic greeting cards between the central electronic mail communication system 100 and the receiving personal communicator 102. For example, the blank cards could be sent at a very high compression ratio, such as 200 to 1, but yield a relative low resolution when viewed such as on the display 126. Then, when a final electronic greeting card is delivered to a receiving personal communicator 102, it may be sent using a finer resolution ratio, possibly 50 or 30 to 1 compression. This would then yield a much higher quality image when displayed or printed out. A side benefit of having low resolution blank cards is that because of the resolution is not as fine the image is relatively useless to print out or send off. This tends to deter theft of blank cards and of counterfeiting. However, when the final card is transmitted from the electronic mail server 136 it would be sent in its full resolution mode and received by the receiving personal communicator 102 with a high quality image.

Additionally, the billing system is integrated in the user selection process and sending of the electronic greeting card such that the originator of the artwork, i.e., the electronic greeting card store 142, can be paid for each purchase of one of its electronic greeting card products. The act of sending a request for an electronic greeting card to the electronic mail server 136 and being processed by the electronic mail server 136 to update billing information in its accounting system 138 and forward billing information to the electronic greeting card store 142 is the equivalent of paying the cashier at a physical store selling electronic greeting cards. However, the billing process in the present invention can be handled automatically as part of the electronic mail communication system 100.

In summary, the electronic mail communication system 100 can down load a catalog of an electronic greeting cards into a personal communicator 102 such that a user of the personal communicator 102 can browse through the catalog while off line to the central electronic mail server 136. The user can make a selection, and optionally customize the electronic greeting card with a personal message, in a totally off line mode at the local personal communicator 102 without requiring the on line services of the electronic mail server 136. Then, after making the selection and possibly personalizing the electronic greeting card, the user can send the order into the central server 136 which then can automatically deliver the order and bill the sender. This makes the transaction very efficient.

Optionally, a customized personal message may comprise a collection of images displayed in a video sequence to simulate a moving image. Further, audio can be incorporated as part of the electronic greeting card message to provide an audible message to the recipient while viewing the video sequence. For example, the recipient may be presented with a video sequence of the sender's face singing happy birthday, while a contemporaneously presented audible message provides the sender's voice singing happy birthday to the recipient of the greeting card. Additionally, the video sequence may include holographic images that can be displayed to the recipient to simulate a three dimensional life-like moving image which adds a realistic appearance to the message.

What is claimed is:

1. An electronic greeting card communication system, comprising:
   a first personal communicator for transmitting and receiving electronic greeting cards, comprising:
   a memory for storing the electronic greeting cards available from an electronic greeting card supplier;
   a receiver for receiving a user selection of an electronic greeting card from said memory of the first personal communicator;
   a controller for generating a request message for requesting the selection of the electronic greeting card to be transmitted to a second personal communicator; and
   a transmitter for transmitting the request message corresponding to the selection of the electronic greeting card, the request message including at least an electronic greeting card identifier and a destination identifier;
   an electronic mail server, coupled to the electronic greeting card supplier, for receiving the request message from the first personal communicator, and for processing the request message and wireless transmitting the electronic greeting card corresponding to the selection of the electronic greeting card to the second personal communicator; the electronic mail server updating billing information associated with an account of the first personal communicator in response to the electronic greeting card being transmitted for billing the user of the first personal communicator; and
   the second personal communicator comprising:
   a selective call receiver for receiving the wireless transmitted electronic greeting card; and
   means for presenting coupled to the selective call receiver for presenting the electronic greeting card including an electronic greeting card image corresponding to the representation thereof to a user of the second personal communicator.

2. The electronic greeting card communication system of claim 1, wherein the electronic mail server further comprises:
   means for updating the billing information associated with the account of the first personal communicator by electronically debiting the account of the user of the first personal communicator with a price corresponding to the electronic greeting card; and
   means for updating the selection of greeting cards available from the electronic greeting card supplier.

3. The electronic greeting card communication system of claim 2, wherein the electronic mail server, in response to transmitting the electronic greeting card, further updates the billing information by crediting the account of the electronic greeting card supplier for paying the electronic greeting card supplier with a fee corresponding to the transmitted electronic greeting card.

4. The electronic greeting card communication system of claim 1, wherein the representation of an electronic greeting card image is a digital representation thereof, and wherein the first personal communicator comprises:
   a browsing memory for storing a collection of digital representations of electronic greeting card images, each one of the digital representations being identified by a respective electronic greeting card identifier;
   a controller coupled to the browsing memory for controlling the selection process in the first personal communicator for selection of the electronic greeting card by a user;
   a display coupled to the controller for displaying at least one electronic greeting card image corresponding to the digital representation thereof for viewing by the user of the first personal communicator as part of the selection process; and
   a user input device coupled to the controller for accepting user input to make the selection of one of the electronic greeting card images being part of the collection stored in the browsing memory.

5. The electronic greeting card communication system of claim 4, wherein each one of the collection of digital representations of electronic greeting card images is stored in the browsing memory in a compressed format that can be expanded for retrieving the digital representation of the electronic greeting card image therefrom.

6. The electronic greeting card communication system of claim 5, wherein compression format utilizes asymmetric image compression/expansion techniques.

7. The electronic greeting card communication system of claim 5, wherein the compression format utilizes fractal compression/expansion techniques.

8. The electronic greeting card communication system of claim 5, wherein the electronic greeting card images being stored in the browsing memory as a collection of digital representations thereof are low quality resolution electronic greeting card images sufficient for viewing by the user of the first personal communicator during the selection process, and wherein the electronic greeting card image corresponding to the representation thereof included with the electronic greeting card message is a high quality resolution electronic greeting card image for viewing by the user of the second personal communicator.

9. A method in a communication system, comprising the steps of:
   selecting an electronic greeting card by a user having a first personal communicator, the step of selecting further comprises:
      displaying the electronic greeting cards stored from a memory of the first personal communicator of available electronic greeting cards of an electronic greeting card supplier; and
      receiving a user selection of the electronic greeting card;
   generating a request message for requesting the selection of the electronic greeting card to be transmitted to a user of a second personal communicator;
   transmitting the request message corresponding to the selection of the electronic greeting card, the request message including at least an electronic greeting card identifier and a destination identifier;
   receiving the request message at an electronic mail server at the electronic greeting card supplier;
   processing the request message to determine the electronic greeting card corresponding to the selection;
   transmitting an electronic greeting card message corresponding to the selection of the electronic greeting card to the second personal communicator including a destination identifier for identifying the second personal communicator;
   updating billing information associated with an account in response to the electronic greeting card being transmitted for debiting the user of the first personal communicator and crediting the account of and updating the selection of electronic greeting cards available from the electronic greeting card supplier for the price of the greeting card;
   receiving the transmitted electronic greeting card by the second personal communicator; and
   presenting the electronic greeting card the user of the second personal communicator.

10. The method of claim 9, further comprising the steps of:
   adding a digital representation of a personalized message to the request message;
   transferring the digital representation of the personalized message from the received request message to the electronic greeting card for transmitting therewith; and
   presenting a personalized message corresponding to the digital representation thereof along with the electronic greeting card to the user of the second personal communicator.

11. The method of claim 10, wherein the personalized message is a voice message.

12. The method of claim 10, wherein the personalized message is a handwritten message.

13. An electronic greeting card communication system, comprising:
   a first personal communicator for transmitting and receiving electronic greeting cards, comprising:
      a browsing memory for storing the electronic greeting cards available from an electronic greeting card supplier;
      a receiver for receiving a user selection of an electronic greeting card from said memory of the first personal communicator;
   wireless transmitting a request message corresponding to the selection of the electronic greeting card, the request message including at least an electronic greeting card identifier and a destination identifier, the first personal communicator further comprising:

- the browsing memory of the first personal communicator stores a collection of digital representations of electronic greeting card images, each one of the digital representations being identified by a respective one electronic greeting card identifier;
- a controller coupled to the browsing memory for controlling a selection process in the first personal communicator for selection of an electronic greeting card by a user;
- a graphical liquid crystal display coupled to the controller for displaying at least one electronic greeting card image corresponding to the digital representation thereof for viewing by the user of the first personal communicator as part of the selection process;
- a keyboard coupled to the controller and the receiver for receiving the user input to make the selection of one of the electronic greeting card images being part of the collection stored in the browsing memory;
- a personalized message input means for capturing a digital representation of a personalized message from the user of the first personal communicator and for adding the digital representation of the personalized message to the request message; and
- a wireless transmitter coupled to the controller for wireless transmitting the request message; and an electronic mail server, coupled to the electronic greeting card supplier, for receiving the request message from the first personal communicator and for processing the request message and transferring the digital representation of the personalized message from the received request message to an electronic greeting card and then wireless transmitting the electronic greeting card to a second personal communicator; the second personal communicator being identified by the destination identifier, the electronic mail server updating billing information by debiting an account of the first personal communicator in response to the electronic greeting card message being transmitted for billing the user of the first personal communicator therefor, and further comprises means for updating billing information by crediting an account of the electronic greeting card supplier for paying the electronic greeting card supplier with a fee corresponding to the transmitted electronic greeting card, and updating the selection of electronic greeting cards available from the electronic greeting card supplier; and the second personal communicator comprising:
- a selective call receiver for receiving the wireless transmitted electronic greeting card; and
- means for presenting coupled to the selective call receiver for presenting to a user of the second personal communicator the electronic greeting card including an electronic greeting card image corresponding to the representation of the personalized message.

* * * * *